(12) United States Patent
Park et al.

(10) Patent No.: US 7,434,249 B2
(45) Date of Patent: Oct. 7, 2008

(54) FTTH PON THAT O/E CONVERTS 1310 NM FOR OUTPUT TO TRANSMITTERS FOR E/O AS 1550 NM

(75) Inventors: Se-Hong Park, Seoul (KR); Seong-Ha Kim, Yongin-si (KR); Gil-Yong Park, Suwon-si (KR); Tae-Sung Park, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 846 days.

(21) Appl. No.: 10/852,285

(22) Filed: May 24, 2004

(65) Prior Publication Data

US 2005/0172328 A1    Aug. 4, 2005

(30) Foreign Application Priority Data

Jan. 30, 2004   (KR) .................. 10-2004-0006144

(51) Int. Cl.
*H04N 7/173* (2006.01)
*H04J 14/00* (2006.01)
*H04B 10/00* (2006.01)

(52) U.S. Cl. .................. 725/129; 725/127; 398/43; 398/45; 398/48; 398/140

(58) Field of Classification Search .................. 725/129, 725/127; 398/43, 45, 48, 140
See application file for complete search history.

(56) References Cited

U.S. PATENT DOCUMENTS 6,486,907 B1 * 11/2002 Farber et al. .................. 725/78
6,577,414 B1 * 6/2003 Feldman et al. ................ 398/43
6,718,553 B2 * 4/2004 Kenworthy .................. 725/118
2002/0063924 A1 * 5/2002 Kimbrough et al. ......... 359/125
2003/0236916 A1 * 12/2003 Adcox et al. ................. 709/245
2005/0195038 A1 * 9/2005 Neenan et al. .............. 330/308
2007/0077069 A1 * 4/2007 Farmer et al. ................. 398/72

OTHER PUBLICATIONS

Alcatel, Optical Fibers Pave the Way to Faster Broadband Access, 2nd Quarter 2005, Alcatel Telecommunications Review, Technology White Paper.*

* cited by examiner

*Primary Examiner*—Hoang-Vu A Nguyen-Ba
(74) *Attorney, Agent, or Firm*—Cha & Reiter, LLC

(57) ABSTRACT

A fiber to the home (FTTH) system based on a passive optical network (PON) includes an optical line terminal (OLT) block, an optical network terminal (ONT) block, and an optical distribution network (ODN). The ONT block includes a video-optical line terminal (V-OLT) and an OLT to output optical signals of the V-OLT and the OLT by multiplexing the optical signals. The V-OLT receives cable TV (CATV), master antenna (MATV), and satellite broadcasting (SB) optical signals inputted from a broadcasting service network to output received signals as a first optical signal having a predetermined wavelength band. The ONT block includes a video-optical network terminal (V-ONT) and an (ONT) to split multiplexed data communications signals, and CATV broadcasting, MATV broadcasting, and (SB) optical signals. The V-ONT processes the split CATV broadcasting, MATV, and (SB) optical signals to provide subscribers with the split cable CATV, MATV and SB optical signals.

14 Claims, 8 Drawing Sheets

FTTH PON THAT O/E CONVERTS 1310 NM FOR OUTPUT TO TRANSMITTERS FOR E/O AS 1550 NM

CLAIM OF PRIORITY

This application claims priority to an application entitled "FTTH system based on passive optical network for broadcasting service," filed in the Korean Intellectual Property Office on Jan. 30, 2004 and assigned Ser. No. 2004-6144, the contents of which are hereby incorporated by reference.

BACKGROUND OF THE INVENTION

1. Field of the Invention

The present invention relates to a Fiber To The Home (FTTH) system based on a passive optical network (PON) capable of providing subscribers with one or more of a high-speed data service, a voice service, and a broadcasting service using an optical fiber instead of an existing telephone line. More particularly, the present invention is related to a structure of a PON-based FTTH system and a method for establishing the same to provide a satellite broadcasting service by utilizing a conventional overlay CATV broadcasting service system in order to match the various/discriminated requirements of subscribers.

2. Description of the Related Art

With regard to the construction of access networks from a telephone office to a building and a home, there have been some recently developed network structures and methods for improving the various networks. Some examples of the various network structures and the methods for improving same include the use of an x-digital subscriber line (xDSL), a hybrid fiber coax (HFC), a fiber to the building (FTTB), a fiber to the curb (FTTC), a fiber to the home (FTTH) and so forth. Among such structures and methods, the FTTx (x=B, C, H) can be classified into both an active FTTx embodied as a structure of an active optical network (AON) and a passive FTTx embodied as a structure of a passive optical network (PON).

At present, since a PON (when considered in relation to a passive FTTx) has a point-to-multipoint topology using passive elements, the PON has been suggested as a possible access network of the future because of its economical efficiency. In other words, a PON connects an optical line terminal (OLT) to a plurality of optical network terminals (ONTs) through a single optical fiber by means of a 1×N passive optical distribution network (1×N passive ODN), thereby forming a distribution topology of a tree structure.

FIG. 1 is a schematic view showing an entire structure of a conventional PON-based FTTH system. The PON-based FTTH system provides a broadcasting and communications convergence type access network that is capable of providing subscribers with high-speed data services, voice services, and broadcasting services. Referring to FIG. 1, in the PON-based FTTH system, a CATV Tx 111, which is positioned at an optical line terminal block 110, receives CATV broadcasting signals input from a broadcasting service network (HFC network) 107 and outputs an optical signal having a predetermined wavelength of $\lambda_1$. An OLT 112 generally includes a down stream optical transmitter and an upstream data optical receiver and makes data communication with a data service network 108, such as high-speed Ethernet, etc. The CATV optical signals output from the CATV Tx 111 are then combined with optical signals of data from the OLT 112 by a wavelength multiplexing division-coupler (WDM-coupler) 113. Thereafter, the combined optical signals that are output by the WDM-coupler 113 are then input to an optical distribution network (ODN) 104. Herein, the ODN 104 is an optical transmission medium connecting the OLT block 110 to an ONT block 120. Such an ODN 104 has a variety of arrangements that depend in part on the various network structures. However, the ODN normally includes an optical power splitter, which is a passive component, and a single mode fiber (SMF). After the combined optical signals of the OLT 112 and the CATV Tx 111 passthrough the ODN 104, such signals are then input to the ONT block 120, whereby the input optical signals are split by a WDM-coupler 123 so as to be input to a CATV Rx 126 and an ONT 125, respectively.

As described above, a CATV broadcasting service is provided through an overlay method in the PON-based FTTH system, and this service is easily achieved by applying a CATV broadcasting optical transmitter and a CATV broadcasting optical receiver, which are installed between the H/E (Headend) of the HFC network 107 and an optical network unit, to a PON system.

In the current state, the CATV broadcasting optical transmitter may use a wavelength band of 1310 nm depending on the network structure of the HFC network. However, there is a great deal of difficulty in using the wavelength band of 1310 nm when constructing a network using an FTTH access network system. One reason for the difficulty is that even though the wavelength band of 1310 nm is subject to less dispersion than a wavelength band of, for example, 1550 nm, the wavelength band of 1310 nm represents a greater loss than the wavelength band of 1550 nm. In addition, optical fiber amplifiers that are currently in use may not be adaptable for the wavelength band of 1310 nm. Accordingly, if the optical fiber amplifiers are not adaptable for 1310 nm, it becomes very difficult to increase the number of subscribers if a network is constructed by using a PON-based FTTH system.

On the other hand, an optical transmitter of the wavelength band of 1550 nm, which may be partially used depending on a structure of the HFC network in the HFC network, mainly employs an external modulation method for use in long distance transmissions from H/E to ONT. However, the optical transmitter that employ the external modulation method require higher operational costs when compared with optical transmitters that employ a direct modulation method, so that costs for a broadcasting service may increase.

Also, current FTTH systems have structures for providing only CATV broadcasting services input through the HFC network. In other words, the currently used FTTH systems have no alternative/backup plan for subscribers' requirements for satellite broadcasting services.

SUMMARY OF THE INVENTION

Accordingly, the present invention has been made in part to solve at least some of the above-mentioned problems. A first aspect of the present invention the provision of a PON-based FTTH system used for a large number of subscribers.

A second aspect of the present invention is to provide a PON-based FTTH system adapted for providing broadcasting services to subscribers at a relatively-low cost.

A third aspect of the present invention is to provide a PON-based FTTH system adapted for providing subscribers with satellite broadcasting services having various/discriminated digital multimedia contents in addition to master antenna TV (MATV) services or cable broadcasting services (CATV), all of which is transmitted through one optical fiber.

In order to accomplish at least some of these aspects of the present invention, a PON-based FTTH system employs a wavelength band of 1550 nm instead of a wavelength band of 1330 nm used in an HFC network in order to provide broadcasting services to subscribers located in an ONT. The PON-based FTTH system is adapted for use by a very large number of subscribers by employing the wavelength band of 1550 nm. The PON-based FTTH system provides the subscribers with broadcasting services at relatively low costs by using an optical transmitter that employs a direct modulation method instead of an external modulation method. The PON-based FTTH system may simultaneously provide the subscribers with satellite broadcasting services together with other broadcasting services by employing a satellite optical transmitter and a satellite optical receiver.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Figure 1:
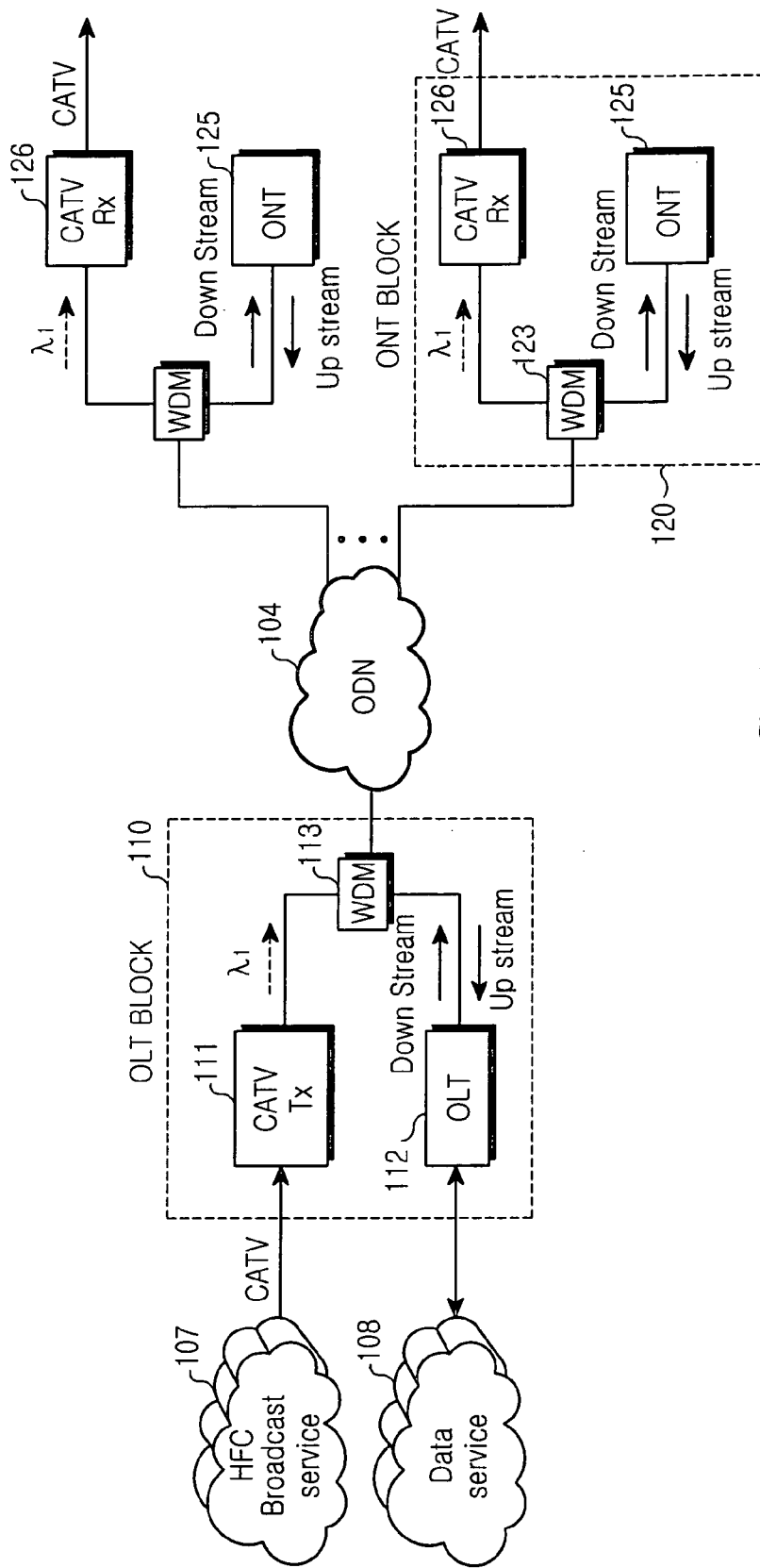
FIG. 1 is a schematic view showing an entire structure of a conventional PON-based FTTH system.

Hereinafter, several aspects of the present invention will be described in detail with reference to the accompanying drawings. Note that the same or similar components in drawings are designated by the same reference numerals as far as possible although they are shown in different drawings. For the purposes of clarity and simplicity, a detailed description of known functions and configurations incorporated herein will be omitted as it may obscure the subject matter of the present invention.

Figure 2:
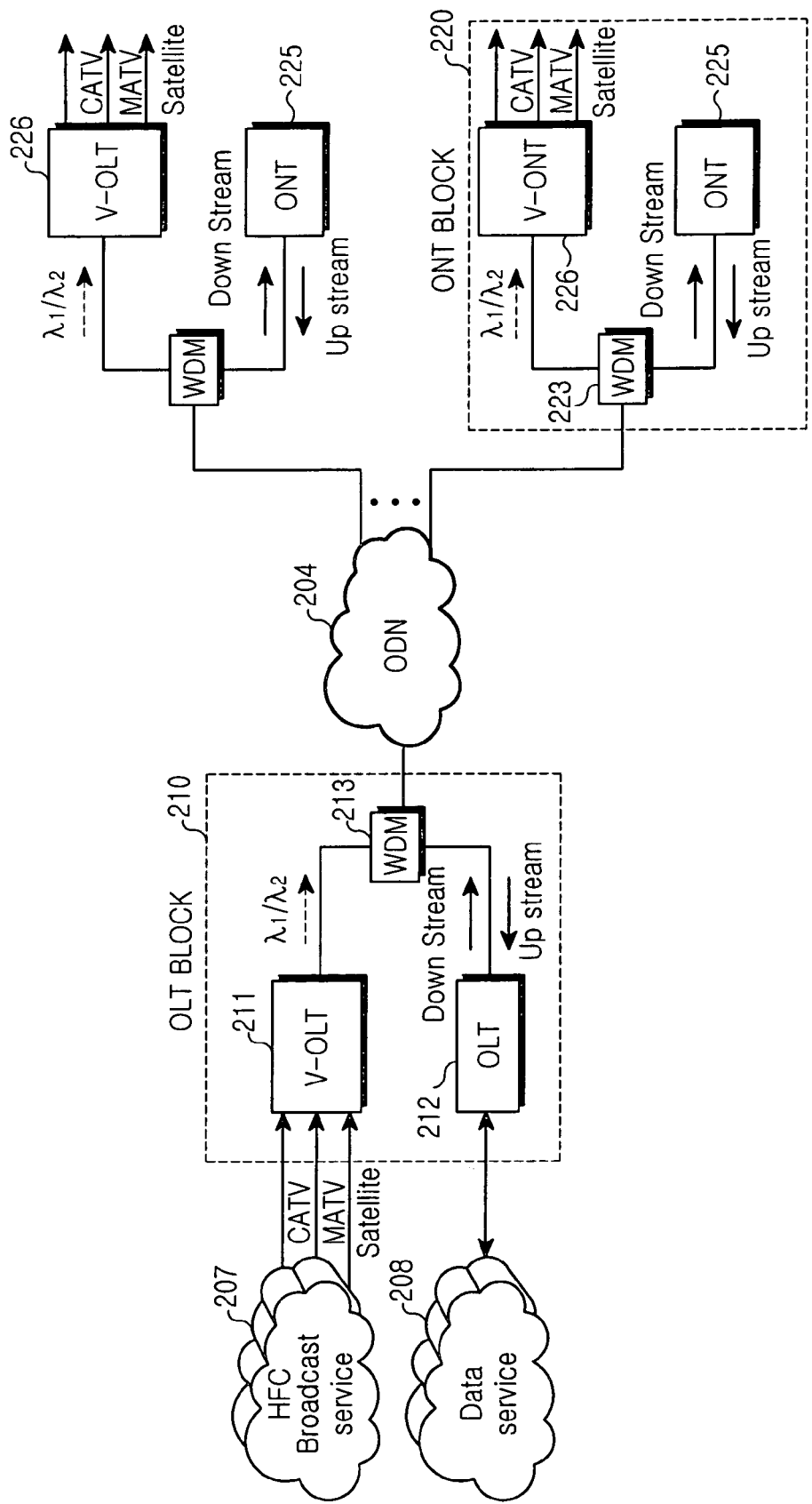
FIG. 2 is a schematic view showing an entire structure of a PON-based FTTH system according to a first aspect of the present invention.

FIG. 2 is a schematic view showing an entire structure of a PON-based FTTH system according to a first aspect of the present invention. According to this aspect, the PON-based FTTH system includes a structure for providing master antenna TV (MATV), cable TV (CATV), and for satellite broadcasting. Referring to FIG. 2, the PON-based FTTH system includes an OLT block 210, an ONT block 220, and an ODN block 204. The OLT block 210 includes a video-optical line terminal (V-OLT) 211, an OLT 212 and a WDM-coupler 213. The ONT block 220 includes a video-optical network terminal (V-ONT) 226, an ONT 225, and a WDM-coupler 233.

The V-OLT 211 positioned in the OLT block 210 receives CATV, MATV, and satellite broadcasting signals from a broadcast service network 207 (HFC network) and outputs the MATV and satellite broadcasting signals and the CATV broadcasting signals as optical signals having wavelengths $\lambda_1$ and $\lambda_2$, respectively. The OLT 212 includes a downstream data optical transmitter and an upstream data optical receiver (represented by the upstream and downstream arrows). The OLT 212 receives data communication signals provided from a data service network 208 such as high-speed Ethernet so as to output the data communication signals as optical signals having different wavelengths from the V-OLT 211. Broadcasting optical signals output from the V-OLT 211 are combined with data optical signals outputted from the OLT 212 by the WDM-coupler 213. Thereafter, the combined optical signals are then input to the ODN 204. Herein, the ODN 204 operates as an optical transmission medium by connecting the OLT block 210 to the ONT block 220. Such an ODN 204 has a variety of arrangements depending on the network structures, and includes an optical power splitter and an SMF, which are passive elements. The data optical signals output from the OLT 212, the MATV, satellite broadcasting optical signals, and the CATV broadcasting optical signals from the V-OLT 211 are input to the ONT block 220 through the ODN 204. Then, the input optical signals are split so that optical signals are input into the V-ONT 226 and the ONT 225, respectively, by the WDM-coupler 223. The V-ONT 226 provides subscribers with the input CATV broadcasting signals and the input MATV and satellite broadcasting signals. The ONT 225 includes an upstream data optical transmitter and a downstream data optical receiver for data communication.

Figure 4:
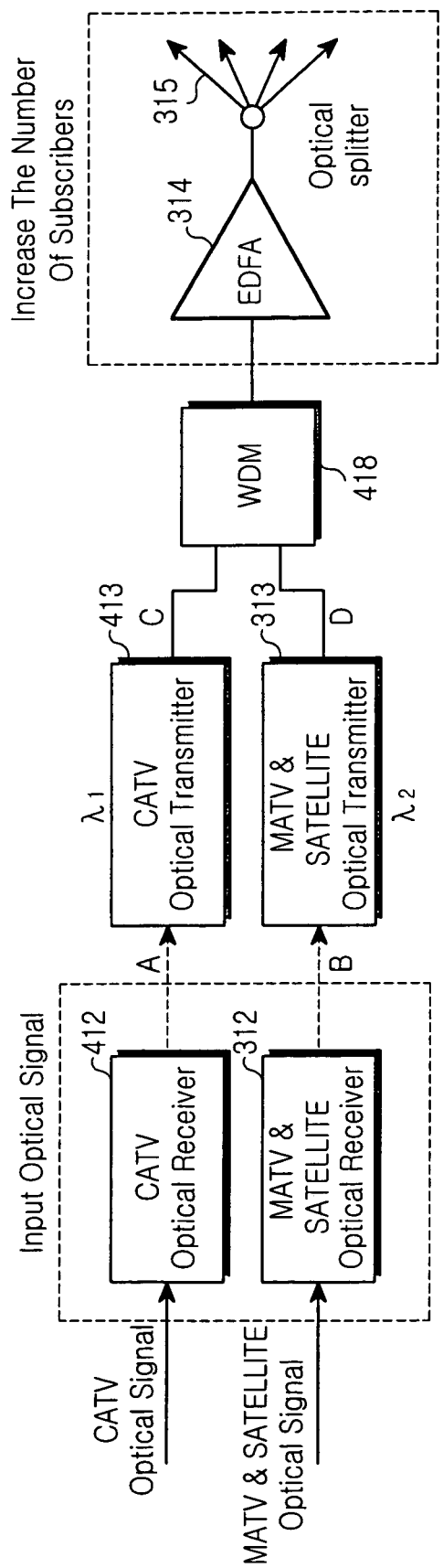
FIG. 4 is a block diagram showing a structure of a V-OLT, in detail, shown in FIG. 2 according to another aspect of the present invention.

Hereinafter, a structure and an operation of the V-OLT 211 included in the OLT block 210 according to one aspect of the present invention will be described in detail with reference to the accompanying drawings. FIG. 4 shows the structure of the V-OLT 211 shown in FIG. 2 in detail. The V-OLT 211 shown in FIG. 4 basically includes a CATV optical receiver 412, an MATV and satellite optical receiver 312, a CATV optical transmitter 413, an MATV and optical transmitter 313, and a WDM 418. Also, the V-OLT 211 further includes an erbium doped fiber amplifier (EDFA) 314 and a 1×4 optical splitter 315 for use when the number of subscribers increases.

The V-OLT 211 shown in FIG. 4 has a structure adaptable both CATV broadcasting and MATV and satellite broadcasting. If signals input from the HFC network 207 are optical signals, the CATV broadcasting signals and the MATV and satellite broadcasting signals input to the V-OLT 211 are inputted to the CATV optical receiver 412 and the MATV and satellite optical receiver 312, respectively. Signals output from the CATV optical receiver 412 are provided to the CATV optical transmitter 413 and signals output from the MATV and satellite optical receiver 312 are input to the MATV and satellite optical transmitter 313. At this time, if signals input from the HFC network are not optical signals, the signals are directly input to the MATV and satellite optical transmitter 313 and the CATV optical transmitter 413. Herein, it is assumed that the CATV broadcasting optical signals and the MATV and satellite broadcasting optical signals generally have a wavelength band of 1310 nm. However, as the wavelength band of 1310 nm is not well-suited for the FTTH access network based on a PON in view of optical wavelength assignment, network construction, network costs, and optical fiber loss.

Therefore, according to the present invention, the CATV optical receiver 412 and the MATV and satellite optical receiver 312 receive optical signals having a wavelength band of 1310 nm and convert the optical signals into electrical signals so as to output electrical signals. The CATV optical transmitter 413 and the MATV and satellite optical transmitter 313 receive the respective electrical signals and convert the received signals into optical signals having a wavelength band of 1550 nm so as to output the converted signals as a CATV broadcasting optical signal having a wavelength band of $\lambda_1$ and an MATV and satellite broadcasting optical signal having a wavelength band of $\lambda_2$. In addition, optical signals of the CATV optical transmitter 413, and the MATV and satellite optical transmitter 313 are modulated through a direct modulation method, so network construction costs may be reduced as compared with network construction costs based on an external modulation method. However, even though the direct modulation method may cause signal degradation as compared with the external modulation method, the FTTH system according to the present invention can employ the direct modulation method because transmission of signals is carried out within a relatively-short distance and the FTTH system is achieved with respect to a premise. As described above, the optical signals output from the CATV optical transmitter 413 and the MATV and satellite optical transmitter 313 are multiplexed by the WDM-coupler 418 so as to be output. In addition, an RF level adjusting device can be additionally installed in input ports A and B of optical transmitters 413 and 313 in order to adjust RF levels of broadcasting channels according to intensities of optical signals inputted to the optical transmitters 413 and 313 to optimized input conditions of the optical transmitters.

Meanwhile, in order to increase the number of subscribers for a network, the V-OLT 211 further includes an optical amplifier 314 amplifying signals outputted from the WDM-coupler 418 up to an optimum level, that is an optical amplifier having a wavelength band of 1550 nm (EDFA), and an optical splitter 315 splitting the signals amplified by the optical amplifier 314 in a 1×N method so as to output the split signals. In addition, if optical signals output from the CATV optical transmitter 413 and the MATV and satellite optical transmitter 313 are sufficiently large as compared with input conditions of the EDFA, an optical splitter is additionally installed in output ports C and D of the optical transmitters 413 and 313, as described above. For example, if the optical splitter 315 splits inputted optical signals into four optical signals, the optical splitter 315 outputs the split optical signals into four output ports of the V-OLT 211. In FIG. 2, the V-OLT 211 shows an example of a signal output through one output port thereof. If output signals of the V-OLT 211 are branched into four output ports by the optical splitter 315 as shown in FIGS. 3 and 4, components shown in FIG. 2 are installed so as to correspond to each output port of the V-OLT 211, so that it is adaptable even if the number of subscribers increases.

Although the P ON-based FTTH system having the V-OLT 211 described above according to one aspect of the present invention has a structure for providing both CATV broadcasting service, MATV and satellite broadcasting services, the FTTH system can be constructed in order to provide only the MATV and satellite broadcasting service, without the CATV broadcasting service. FIG. 3 shows the V-OLT 211 having different structure from a structure shown in FIG. 4. The V-OLT 211 shown in FIG. 3 basically includes the MATV and satellite optical receiver 312 and the MATV and satellite optical transmitter 313. When the number of subscriber increases, the V-OLT 211 shown in FIG. 3 further includes the optical amplifier 314 and a 1×N optical splitter 315, and the MATV and satellite optical transmitter 313 and the optical amplifier 314 further include an optical splitter.

Figure 3:
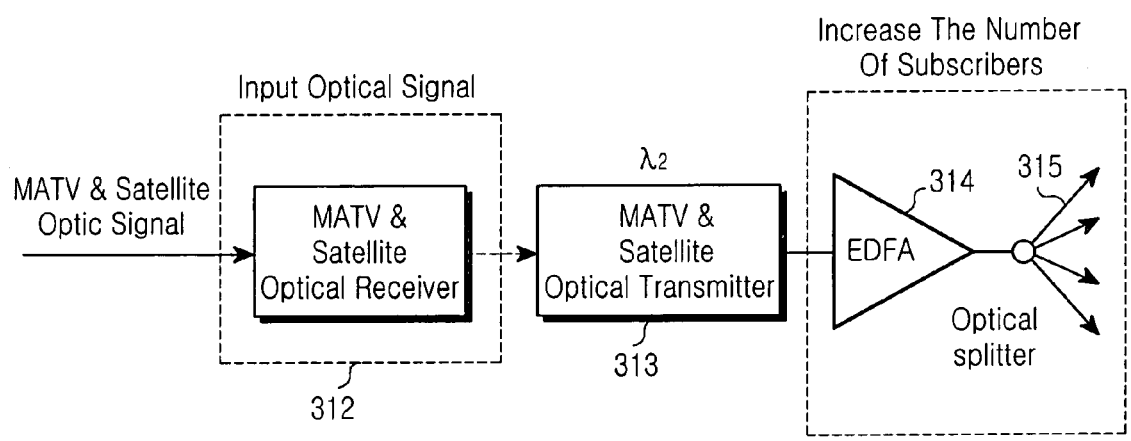
FIG. 3 is a block diagram showing a structure of a V-OLT, in detail, shown in FIG. 2 according to the first aspect of the present invention.

The V-OLT 211 shown in FIG. 3 has a structure adaptable only for the MATV and satellite broadcasting, in which the structure and operation of the V-OLT 211 is identical to those of the V-OLT shown in FIG. 4 except for the CATV optical receiver 412, the CATV optical transmitter 413, and the WDM-coupler 418. In the V-OLT 211 shown in FIG. 3, only an output of the MATV and satellite optical transmitter 313 is directly input into to the optical amplifier 314.

Figure 6:
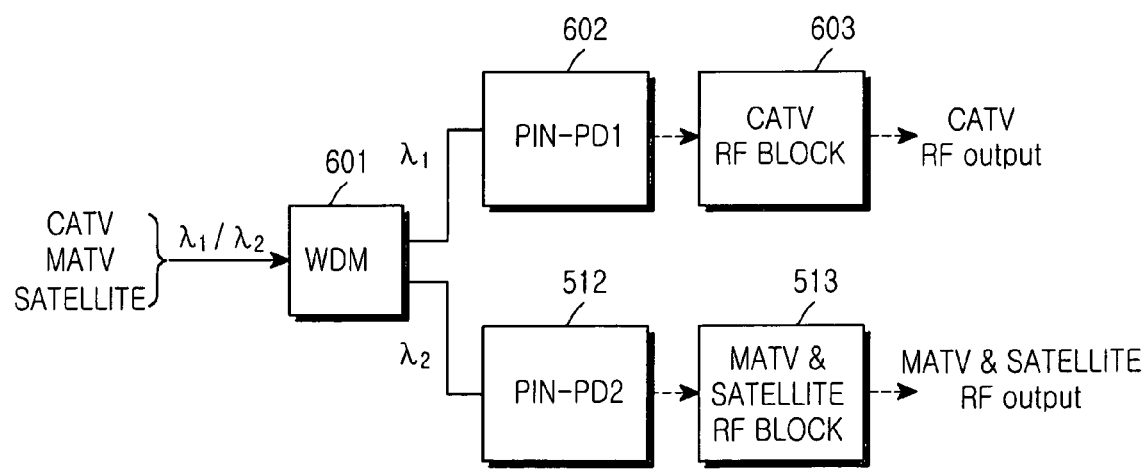
FIG. 6 is a block diagram showing a structure of a V-ONT, in detail, shown in FIG. 2 according to another aspect of the present invention.

Hereinafter, a structure and an operation of the V-ONT 226 included in the ONT block 220 of the PON-based FTTH system shown in FIG. 2 will be described in detail with reference to the accompanying drawing according to another aspect of the present invention. FIG. 6 shows a structure of the V-ONT 226 shown in FIG. 2 in detail. The V-ONT 226 shown in FIG. 6 has a structure adaptable both CATV broadcasting and MATV and satellite broadcasting. First, a WDM-coupler 601 splits an input CATV broadcasting signal having a wavelength of $\lambda_1$ and an input MATV and satellite broadcasting signal having a wavelength of $\lambda_2$ into each other so as to output the split signals. An opto-electrical converting part, a first PONPD1 602, opto-electrically converts the CATV broadcasting signal having a wavelength of $\lambda_1$ split by the WDM-coupler 601 so as to output the converted signals to a CATV RF block 603. A second PIN PD2-512 opto-electrically converts the MATV and satellite broadcasting signals having wavelengths of $\lambda_2$ split the WDM-coupler 601 so as to output the converted signals to a MATV and satellite RF block 513. The CATV RF block 603 performs functions such as amplification of input RF signals and level adjustment of the input RF signals so as to output CATV broadcasting signals. The MATV and satellite RF block 513 performs functions such as amplification of input RF signals and level adjustment of the inputted RF signals so as to output MATV and satellite RF broadcasting signals.

Figure 5:
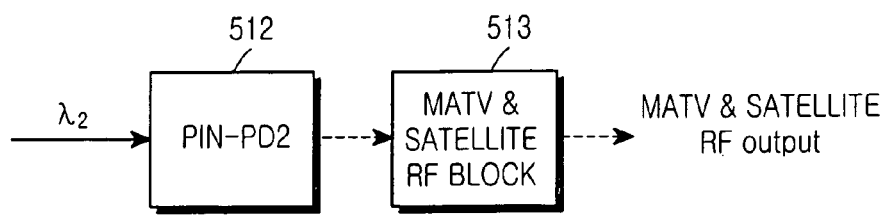
FIG. 5 is a block diagram showing a structure of a V-ONT, in detail, shown in FIG. 2 according to the first aspect of the present invention.

The V-ONT 226 structure described above has a structure adaptable CATV broadcasting service, MATV broadcasting service, and satellite broadcasting service according to the present invention. Also, the V-ONT 226 can be constructed so as to provide only the MATV and satellite broadcasting service without the CATV broadcasting service. FIG. 5 shows the V-ONT 226 having different structure from a structure shown in FIG. 6. The V-ONT 226 shown in FIG. 5 includes the second PIN-PD2-512 and the MATV and RF block 513 and does not include the WDM-coupler 601, the first PIN PD1 602, and the CATV RF block 603 shown in FIG. 6. As shown in FIG. 6, the second PIN PD2-512 and the MATV and satellite RF block 513 convert the MATV and satellite broadcasting signal (a signal having a wavelength of $\lambda_2$) into electric signals and perform functions such as amplification of RF signals and level adjustment of RF signals with respect to the electric signals, thereby outputting MATV and satellite broadcasting signals.

Figure 7:
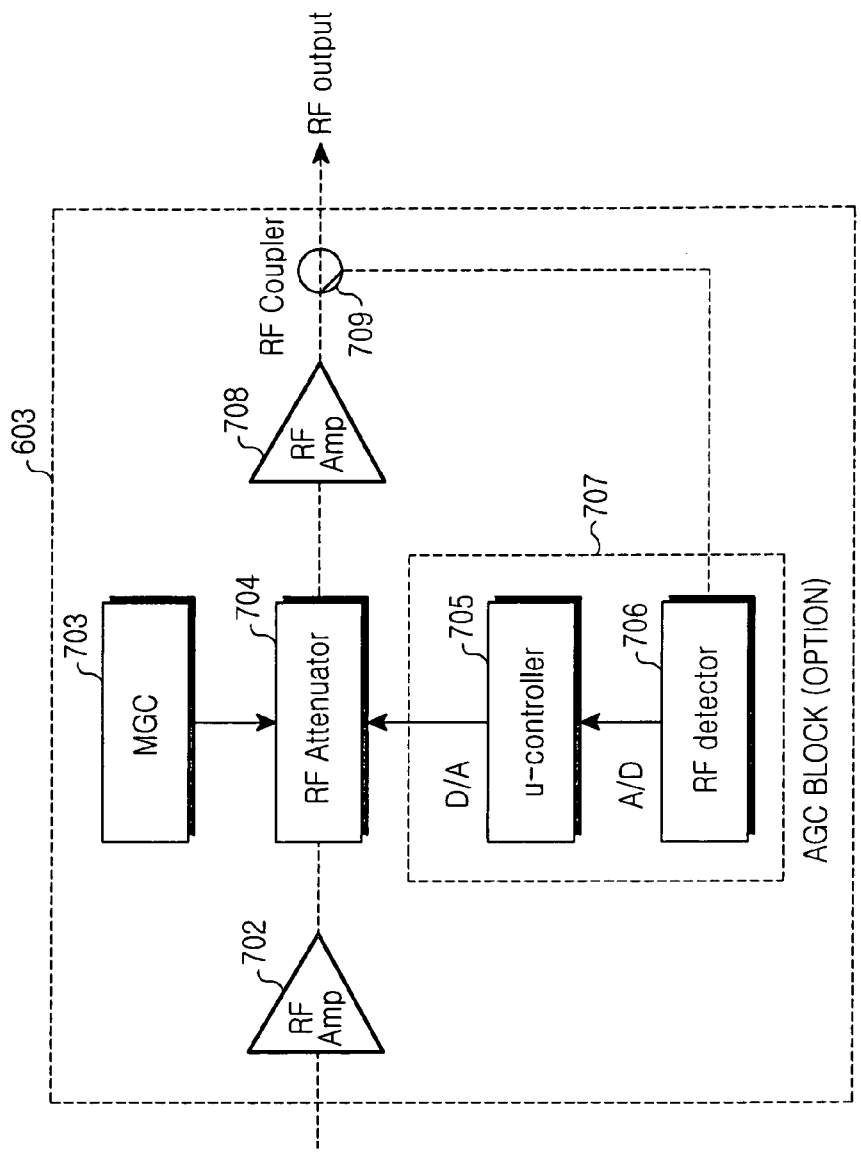
FIG. 7 is a view showing a structure of a CATV RF block, in detail, shown in FIG. 6.

Hereinafter, structures and operations of the CATV RF block 603 and the MATV and satellite RF block 513 shown in FIGS. 5 and 6 will be described in detail with reference to the accompanying drawing. FIG. 7 shows a structure of the CATV RF block 603 shown in FIG. 6 in detail. The CATV RF block 603 shown in FIG. 7 basically includes an input port RF amplifier 702 having a low-noise characteristic, an RF attenuator 704, an output port RF amplifier 708, an RF coupler 709, and an MGC (manual gain controller) 703. Also, the CATV RF block 603 additionally includes a micro-controller 705 and an RF detector 706 in order to add an auto gain control (AGC) function. Meanwhile, it is possible to provide an additional SAW filter between the RF coupler 709 and the RF detector 706 for allowing only a pilot tone to pass through the SAW filter.

In the CATV RF block 603, the input port RF amplifier 702 amplifies input signals, which are input from the first PINPD1-602 as shown in FIG. 6, up to a proper level so as to output the amplified signals. The RF attenuator 704 adjusts output signals of the input port RF amplifier 702 up to a proper level according to control signals of an MGC 703 (and the micro-controller 705) so as to output the adjusted signals. The output port RF amplifier 708 amplifies signals outputted from the RF attenuator 704 up to a proper level so as to output the amplified signals. The MGC 703 adjusts attenuation degree of the RF attenuator 704 by using a reference voltage value set by a user. The CATV RF block 603 may additionally have an AGC function. To this end, the RF coupler 709 splits signals output from the output port RF amplifier 708 so as to provide the RF detector 706 with a portion of the split signals. The RF detector 706 converts "envelope power" of RF signals input to the RF detector 706 into voltage values so as to output the converted signals. The voltage values are provided to an A/D input port of the micro-controller 705. The micro-controller 705 receives provided RF signal information and outputs a proper control signal to the RF detector 704 through a D/A in such a manner that the CATV RF block 603 always outputs constant RF power.

Figure 8:
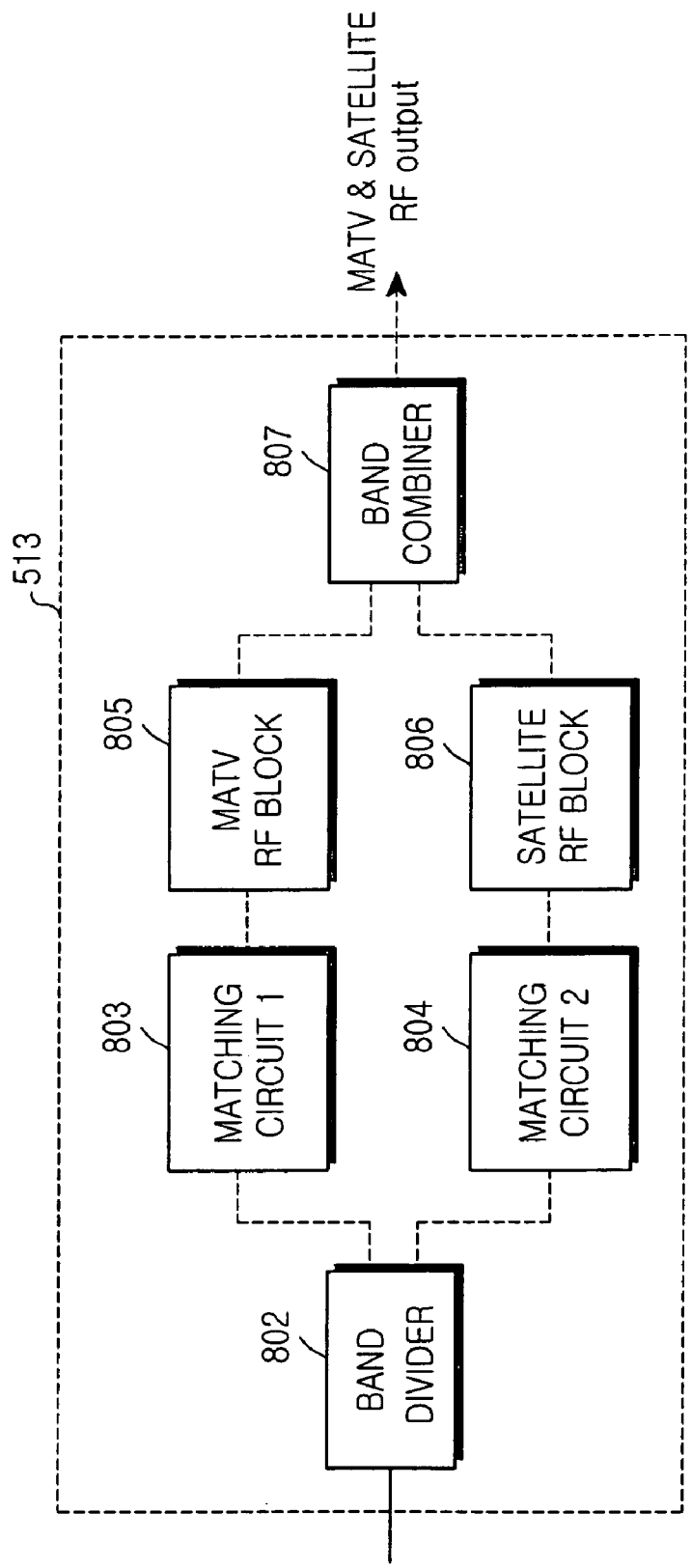
FIG. 8 is a view showing a structure of an MATV and a satellite RF block, in detail, shown in FIGS. 5 and 6.

FIG. 8 is shows the MATV and satellite RF block 513 shown in FIGS. 5 and 6 in detail. The MATV and satellite RF block 513 shown in FIG. 8 includes a band divider 802, a band combiner 807, an MATV RF block 805, a satellite RF block 806, and first and second matching circuits 803 and 804 used for impedance matching.

In the MATV and satellite RF block 513, the band divider 802 divides signals input from the second PINPD2 512 shown in FIG. 6 into signals of an MATV broadcasting band (it is assumed that the MATV broadcasting band is the same as a CATV broadcasting band) and signals of a satellite broadcasting band so as to output the divided signals. The signals of the MATV broadcasting band are inputted to the MATV RF block 805 through the first matching circuit 803. Also, the signals of the satellite broadcasting band are input to the satellite RF block 806 through the second matching circuit 804. The MATV RF block 805 performs functions such as amplification and level adjustment with respect to MATV broadcasting RF signals input to the MATV RF block 805 so as to output the input signals. The satellite RF block 806 performs various functions such as amplification and level adjustment functions with respect to satellite broadcasting signals input to the satellite RF block 806 so as to output the input signals. The band combiner 807 combines signals output from the MATV RF block 805 with signals output from the satellite broadcasting RF block 806 so as to output the combined signals as MATV and satellite broadcasting signals, which are final signals.

Figure 9:
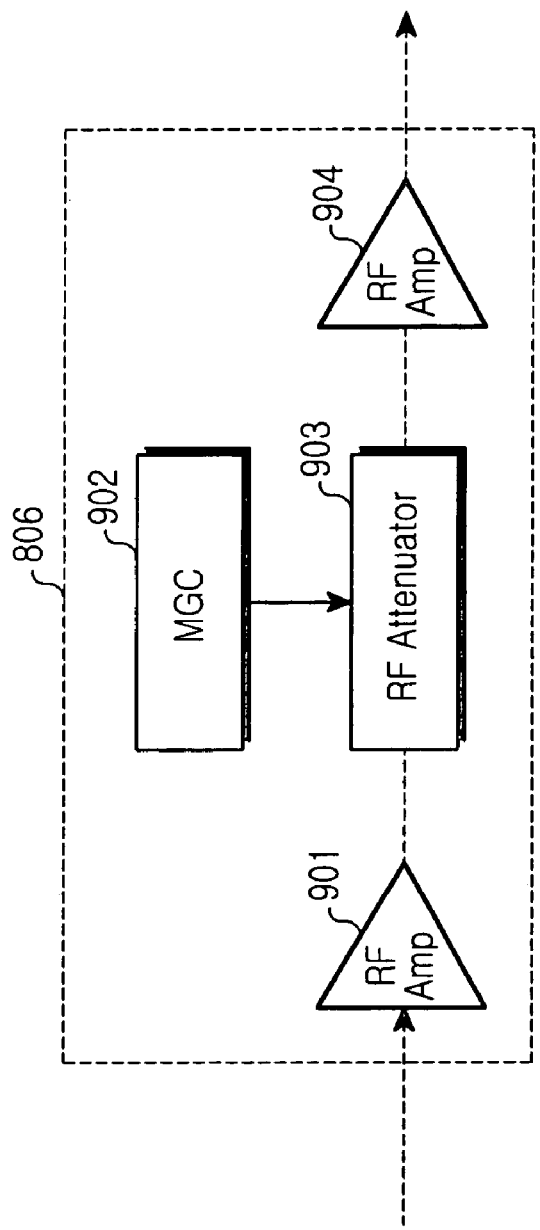
FIG. 9 is a view showing a structure of a satellite RF block, in detail, shown in FIG. 8.

An internal structure and an operation of the MATV RF block 805 are the same as the structure and the operation of the CATV RF block 603 shown in FIG. 7 except that the MATV RF block 806 processes the MATV RF signals. As shown in FIG. 9, the satellite RF block 806 includes an input port RF amplifier 901 of a satellite band, an RF attenuator 903, an MGC 902, and an output port RF amplifier 904. In the satellite RF block 806, the input port RF amplifier 901 amplifies satellite broadcasting band signals input from the second matching circuit 804 shown in FIG. 8 up to a proper level so as to output the amplified signals. The RF attenuator 903 attenuates signals outputted from the input port RF amplifier 901 up to a proper level under the control of the MGC 902 so as to output the attenuated signals. The output port RF amplifier 904 amplifies signals output from the RF attenuator 903 up to a proper level so as to output the amplified signals. The MGC 902 adjusts a degree of attenuation of the RF attenuator 903 using a reference voltage value set by a user.

As described above, the PON-based FTTH system according to the present invention can simultaneously provide MATV, CATV, and satellite broadcasting signals to subscribers at a relatively-low cost. Also, it is possible to easily increase the number of subscribers for the PON-based FTTH system.

A structure and an operation of the PON-based FTTH system according to the present invention can be achieved as described above. While the invention has been shown and described with reference to certain preferred embodiments thereof, it will be understood by those skilled in the art that various changes in form and details may be made therein without departing from the spirit and scope of the invention. In other words, although CATV optical signals, and MATV and satellite broadcasting optical signals of a wavelength band of 1310 nm, which are input from the data service network 208 and the broadcast service network 207 shown in FIG. 2 are described as examples, if optical signals of a wavelength band of 1550 nm are used, the FTTH system can be realized without providing the MATV and satellite optical receiver 312, the MATV and satellite optical transmitter 313, the CATV optical receiver 412, and the CATV optical transmitter 413. In addition, although it is described that the MATV broadcasting signals and satellite broadcasting signals have the same wavelength, according to another aspect of the present invention, they can be separated from each other with different wavelengths. It is also with the spirit of the invention and the scope of the appended claims that the electrical signals can be converted to wavelengths other than 1550 nm as future conditions may dictate.

Besides above, the present invention may include various other arrangements, and the illustrations above are presented for explanation, and not for limitation. Accordingly, the scope of the invention should not be limited to the aspects described above, but should be defined by the appended claims and a broad range of equivalents thereof.

What is claimed is:

1. A fiber to the home (FTTH) system based on a passive optical network, comprising:
   an optical line terminal block comprising a video-optical line terminal (V-OLT) adapted for receiving at least one of a cable television broadcast (CATV), a master antenna television signal (MATV) and a satellite broadcast, and wherein the optical line terminal (OLT) is adapted for receiving a data service, said optical line terminal block providing an output of optical signals from one or more of the video-optical line terminal (V-OLT) and the optical line terminal (OLT);
   a multiplexing division couplet for switching among the optical signals of the (V-OLT) and (OLT), the video-optical line terminal receiving the cable TV signal, a master antenna TV signal, and satellite broadcasting optical signals input from a broadcasting service network so as to output received signals as a first optical signal having a predetermined wavelength band,
   wherein the optical line terminal (OLT) includes a first downstream data optical transmitter and a first upstream data optical receiver outputting a data communication signal input from a data service network as a second optical signal having different wavelength from the video-optical line terminal;
   an optical network terminal (ONT) block including a video-optical network terminal and an optical network terminal for splitting multiplexed data communication signals, cable TV broadcast signals, master antenna TV broadcast signals, and satellite broadcasting optical signals, the video-optical network terminal processing the split cable TV broadcasting, master antenna TV and satellite broadcasting optical signals so as to provide subscribers with the split cable TV broadcast signals, master antenna TV signals and satellite broadcasting optical signals, wherein the optical network terminal (ONT) includes an upstream data optical transmitter and a downstream data optical receiver so as to process split data communication signals; and an optical distribution network (ODN) connecting the optical line terminal block to the optical network terminal as an optical transmission medium;

wherein the video-optical line terminal (V-OLT) includes a master antenna TV and satellite optical receiver for receiving the master antenna TV and satellite broadcasting optical signals so as to convert the master antenna TV and satellite broadcasting optical signals to electric signals and a master antenna TV and satellite optical transmitter for outputting an optical signal having a predetermined wavelength band corresponding to a signal outputted from the master antenna TV and satellite optical receiver, wherein the predetermined wavelength band of the optical signal output by the master TV and satellite transmitter has a different wavelength than the optical signals received by the master TV and satellite optical receiver;

wherein the predetermined wavelength band is a band of 1550 nm, and wherein the optical signal received by the master TV and satellite optical receiver are 1310 nm.

2. The fiber to the home system as claimed in claim 1, further comprising an optical amplifier having an input and an output, said amplifier arranged to receive at its input the output signal of the master antenna TV and satellite optical transmitter, wherein said amplifier amplifies the output of the master TV and the satellite optical transmitter.

3. The fiber to the home system as claimed in claim 2, further comprising
a first optical splitter for splitting the output signals of the master antenna TV and satellite optical transmitter that have been amplified by said amplifier so as to output a first split signal, and a second optical splitter for splitting an output signal of the optical amplifier so as to output a second split signal.

4. The fiber to the home system as claimed in claim 2, wherein the video-optical network terminal includes a multiplexer/demultiplexer for splitting the cable TV broadcasting optical signal and the master antenna TV and satellite broadcasting optical signal into band signals so as to output the band signals, a first opto-electrical converting part for converting the cable TV broadcasting optical signal split by the multiplexer/demultiplexer into a first electrical signal so as to out-put the first electrical signal a cable TV radio frequency block for performing signal processing operations including signal amplification and adjustment with respect to the first electrical signal of the first opto-electrical converting part so as to output a cable TV broadcasting signal, a second opto-electrical converting part for converting the master antenna TV and satellite broadcasting optical signal split by the multiplexer/demultiplexer into a second electrical signal so as to output the second electrical signal, and a master antenna TV and satellite radio frequency block for performing signal processing operations including amplification and adjustment with respect to the second electrical signal of the second opto-electrical converting part so as to output a master antenna TV and satellite broadcasting signal.

5. The fiber to the home system as claimed in claim 4, wherein the outputted master antenna TV and satellite broadcasting signals are outputted without occurring a band combination.

6. The fiber to the home system as claimed in claim 1, wherein the optical line terminal block receives the cable TV broadcasting optical signal and includes a cable TV optical receiver for receiving the cable TV broadcasting optical signal input from the broadcasting service network so as to output the cable TV broadcasting optical signal as an electrical signal, a cable TV optical transmitter for outputting an optical signal having a predetermined wavelength band corresponding to a signal output from the cable TV optical receiver.

7. The fiber to the home system as claimed in claim 6, further comprising an optical amplifier for amplifying an output signal of the master antenna TV and satellite optical transmitter and an optical splitter for splitting an output signal of the optical amplifier so as to output a split signal.

8. The fiber to the home system as claimed in claim 1, wherein the video-optical network terminal includes an opto-electrical converter for converting the master antenna TV and satellite broadcasting optical signal into an electrical signal so as to output a converted signal and a master antenna TV and satellite RF block for outputting the master antenna TV and satellite broadcasting optical signals by performing signal processing operations including amplification and adjustment with respect to the converted signal of the opto-electrical converter.

9. The fiber to the home system as claimed in claim 8, wherein the master antenna TV and satellite radio frequency block includes a master antenna TV block and a satellite radio frequency block, which are divided by a band divider, or processes both the master antenna TV radio frequency band and satellite radio frequency band as a single block without being separated by the band divider.

10. The fiber to the home system as claimed in claim 9, wherein the outputted master antenna TV and satellite broadcasting signals are outputted without occurring a band combination.

11. The fiber to the home system as claimed in claim 8, wherein the outputted, master antenna TV and satellite broadcasting signals are outputted without occurring a band combination.

12. A method of providing a fiber to the home (FTTH) system based on a passive optical network, the method comprising the steps of:
(a) providing an optical line terminal block including a video-optical line terminal (V-OLT) adapted for receiving at least one of a cable television broadcast (CATV), a master antenna television signal (MATV) and a satellite broadcast, and wherein the optical line terminal (OLT) is adapted for receiving a data service , said optical line terminal block providing an output of optical signals from one or more of the video-optical line terminal (V-OLT) and the optical line terminal (OLT);
(b) attaching a multiplexing division coupler to an output of the optical line terminal block for switching among the optical signals of the (V-OLT) and (OLT), wherein the video-optical line terminal receiving the cable TV signal, a master antenna TV signal, and satellite broadcasting optical signals input from, a broadcasting service network so as to output received signals as a first optical signal having a predetermined wavelength band,
(c) configuring the optical line terminal (OLT) to include a first downstream data optical transmitter and a first upstream data optical receiver and output a data communication signal input, from a data service network as a second optical signal having different wavelength from the video-optical line terminal;

(d) arranging an optical network terminal (ONT) block including a video-optical network terminal and an optical network terminal for splitting multiplexed data communication signals, cable TV broadcast signals, master antenna TV broadcast signals, and satellite broadcasting optical signals, the video-optical network terminal processing the split cable TV broadcasting, master antenna TV and satellite broadcasting optical signals so as to provide subscribers with the split cable TV broadcast signals, master antenna TV signals and satellite broadcasting optical signals, wherein the optical network terminal (ONT) includes an upstream data optical transmitter and a downstream data optical receiver so as to process split data communication signals;

(e) connecting an optical distribution network (ODN) to the output of the optical line terminal block and to the optical network terminal as an optical transmission medium; and (f) configuring the optical, line terminal block to receive the cable TV broadcasting optical signal by providing a cable TV optical receiver for receiving the cable TV broadcasting optical signal input from the broadcasting service network so as to output the cable TV broadcasting optical signal as an electrical signal, and providing a cable TV optical transmitter for outputting an optical signal having a predetermined wavelength band corresponding to a signal output from the cable TV optical receiver;

wherein the predetermined wavelength band of the optical signal output by the cable TV optical transmitter has a different wavelength band than the optical signals received by the cable TV optical receiver, wherein the predetermined wavelength band is a band of 1550 nm, and wherein the optical signal received by the master TV and satellite optical receiver are 1310 nm.

13. The method according to claim 12 further comprising: providing the video-optical network terminal with an opto-electrical converter for converting the master antenna TV and satellite broadcasting optical signals into an electrical signal so as to output a converted signal and a master antenna TV and satellite RF block for outputting the master antenna TV and satellite broadcasting optical signals by performing signal processing operations including amplification and adjustment with respect to the converted signal of the opto-electrical converter.

14. The method according to claim 12, further comprising providing the video-optical network terminal with a multiplexer/demultiplexer for splitting the cable TV broadcasting optical signal and the master antenna TV and satellite broadcasting optical signal into band signals so as to output the band signals, a first opto-electrical converting part for converting the cable TV broadcasting optical signal split by the multiplexer/demultiplexer into a first electrical signal so as to output the first electrical signal, a cable TV radio frequency block for performing signal processing operations including signal amplification and adjustment with respect to the first electrical signal of the first opto-electrical converting part so as to output a cable TV broadcasting signal, a second opto-electrical converting part for converting the master antenna TV and satellite broadcasting optical signal split by the multiplexer/demultiplexer into a second electrical signal so as to output the second electrical signal, and a master antenna TV and satellite radio frequency block for performing signal processing operations including amplification and adjustment with respect to the second electrical signal of the second opto-electrical converting part so as to output a master antenna TV and satellite broadcasting signal.

* * * * *